March 23, 1926.  
O. M. SHOLBERG  
FRICTION CLUTCH  
Filed April 16, 1925  
1,577,496
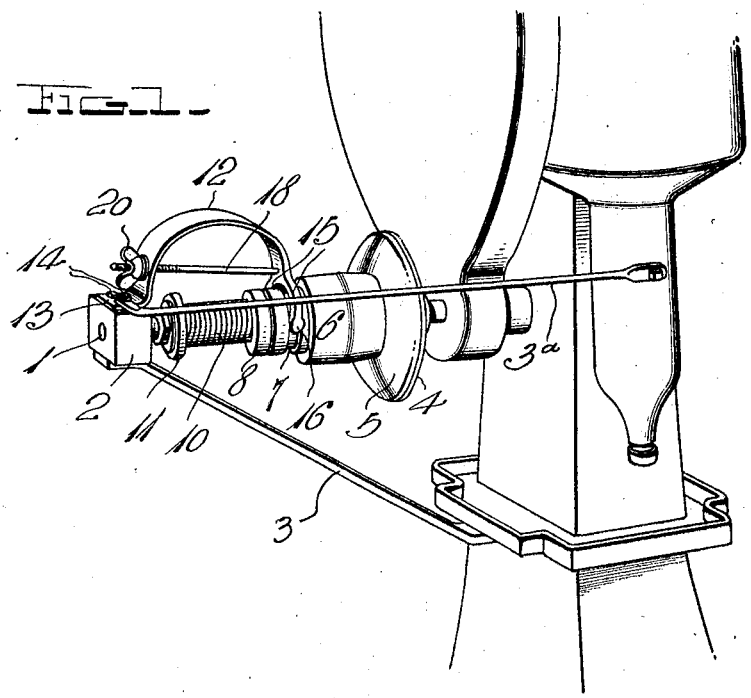
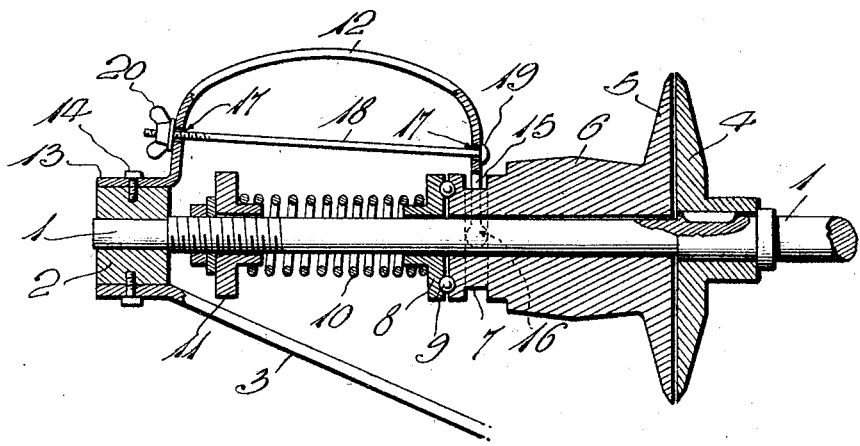
Witness  
H. Woodard
Inventor  
O. M. Sholberg  
By H. B. Willson &co  
Attorneys Patented Mar. 23, 1926.

1,577,496

UNITED STATES PATENT OFFICE.

OLE M. SHOLBERG, OF FERGUS FALLS, MINNESOTA.

FRICTION CLUTCH.

Application filed April 16, 1925. Serial No. 23,619.

*To all whom it may concern:*

Be it known that I, OLE M. SHOLBERG, a citizen of the United States, residing at Fergus Falls, in the county of Otter Tail and State of Minnesota, have invented certain new and useful Improvements in Friction Clutches; and I do declare the following to be a full, clear, and exact description of the invention, such as will enable others skilled in the art to which it appertains to make and use the same.

My invention relates to improvements in clutches and has reference more particularly to those of the friction type embodying relatively fixed and movable clutch members, and the principal object is to provide unique, simple and inexpensive, yet very efficient and advantageous means for controlling contact of the movable clutch member with the stationary member.

A further object is to provide a clutch which is especially adapted for use when an internal combustion engine of the "hit and miss" type is employed for driving any kind of a machine. Ordinarily, engines of this type have a very jerky movement and they thus severely shock the machines driven thereby, each time they fire. By the use of my invention, however, slippage may be allowed between the two clutch members, to absorb the jerks and prevent transmission of them to the machines being operated.

With the foregoing in view, the invention resides in the novel subject matter hereinafter described and claimed, the description being supplemented by the accompanying drawing.

Figure 1 is a perspective view showing the application of my invention to a milk and cream separator.

Figure 2 is a vertical sectional view through the clutch and its controlling means.

In the drawing above briefly described, the numeral 1 designates a shaft which, in the present disclosure, is the drive shaft of a milk and cream separator. The outer end of this shaft is rotatably mounted in a bearing 2 supported by an inclined bar 3 and braced by a rod 3ª. This mounting means for the bearing is preferable when the invention is used in connection with a milk and cream separator of the form shown, but obviously said bearing may be mounted in any other desired manner, according to the construction of the machine in connection with which it is used.

Fixedly secured to the shaft 1, is a clutch disk 4 which is co-operable with a movable clutch disk 5, this disk being, in the present showing, carried by one end of a pulley 6, the opposite end of this pulley being reduced and formed with an external circumferential groove 7. A thrust collar 8 has been shown adjacent this end of the pulley, and ball bearings 9 are preferably interposed between the two. A coiled compression spring 10 is shown surrounding the shaft 1 and acting against the collar 8, said spring re-acting against another collar 11 which is adjustably mounted on the shaft in any desired manner.

At 12, a one-piece, U-shaped spring has been shown, said spring having a laterally extended end 13 on one of its arms, secured by screws or the like 14 to the bearing 2. One of these screws may well anchor the brace rod 3ª to said bearing. The opposite arm of the spring 12 is bifurcated to straddle the reduced end of the pulley 6, the furcations 15 of this arm, being provided on their ends with enlarged lugs 16 which are received in the groove 7, whereby a running connection is established between the spring and the pulley 6 to control the clutch disk 5 in a manner hereinafter described.

Both arms of the spring 12 are formed with openings 17, and a bolt 18 passes through these openings. This bolt is provided with a head 19 on one end which contacts with the outer side of one arm of the spring, while at its other end, a nut 20 is threaded on the bolt, said nut being preferably of a type to be readily operated by hand. This nut contacts with the outer side of the adjacent arm of the spring 12. By tightening the nut 20, the arms of the spring 12 are drawn toward each other and consequently, the disk 5 is pulled away from the disk 4, to allow the former to run freely without driving the shaft 1. By loosening the nut 20, however, the disk 5 of course moves toward the disk 4, and it may be thus gradually brought into frictional contact with the last named disk, to smoothly pick up and drive the shaft 1. Moreover, by regulating the nut 20, the degree of frictional contact between the two disks 4 and 5 may be so regulated as to permit some slippage. Thus, if the pulley 6 is driven by a belt in turn driven by an internal combustion engine having a jerky movement, the jerks will not be imparted to the shaft 1 and the machine operated thereby, with numerous advantages.

As excellent results are obtainable from the details disclosed, they may well be followed. However, within the scope of the invention as claimed, modifications may of course be made.

I claim:

1. In combination with a slidable clutch controlling member, and a stationary member spaced therefrom in the direction of its axis; a U-shaped spring having one of its arms anchored to said stationary member and having a running connection between its other arm and said slidable member, the two arms of said spring having openings, a bolt passing through said openings and having a head contacting with the outer side of one of said arms, and a nut threaded on said bolt in contact with the outer side of the other arm, said nut and bolt being co-operable to draw said arms toward each other.

2. A controlling device for a slidable clutch controlling member, comprising a U-shaped spring having one of its arms bifurcated to straddle the clutch controlling member, the furcations of said bifurcated end being provided with lugs to engage a groove of said member, the other arm of the spring being adapted to be anchored to a stationary member, the two spring arms being formed with openings, a bolt passing through said openings and having a head contacting with the outer side of one of said arms, and a nut threaded on said bolt in contact with the outer side of the other arm, said nut and bolt being co-operable to draw said arms toward each other.

3. In combination with a machine having a laterally projecting drive shaft and a bearing supporting the outer end of said shaft; of a friction disc fixedly secured to said shaft in inwardly spaced relation with the bearing, a belt pulley rotatable upon the shaft, one end of said pulley having a friction disc for co-action with the first named disc while the other end of said pulley is provided with a circumferential groove, a U-shaped spring secured at one end to said bearing, the other end of said spring being bifurcated and engaged with the aforesaid groove, and means for drawing the two ends of the spring toward each other.

4. In combination with a machine having a laterally projecting drive shaft, a bearing supporting the outer end of said shaft, and connecting means between said bearing and the machine; of a friction disk fixedly secured to said shaft in inwardly spaced relation with the bearing, a belt pulley rotatable upon the shaft between the disk and bearing, one end of said pulley having a friction disk for co-action with the first named disk while the other end of said pulley is reduced and provided with an external circumferential groove, a U-shaped spring secured at one end to said bearing, the other end of said spring being bifurcated and having its furcations received in the aforesaid groove, both arms of the spring being formed with openings, a bolt passing through said openings and having a head contacting with the outer side of one of the spring arms, and a nut adjustably threaded on the bolt at the outer side of the other spring arm, said nut and bolt being co-operable to effect relative movement of the two arms of the spring.

In testimony whereof I have hereunto affixed my signature.

OLE M. SHOLBERG.